(12) United States Patent
Cannon et al.

(10) Patent No.: US 6,628,757 B1
(45) Date of Patent: Sep. 30, 2003

(54) FINGERPRINT-ID-ACTIVATED MESSAGE PLAYBACK APPARATUS AND METHOD

(75) Inventors: Joseph M. Cannon, Harleysville, PA (US); James A. Johanson, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/249,932

(22) Filed: Feb. 12, 1999

(51) Int. Cl.7 .......................... H04M 1/64; G06K 9/00; H04K 1/00; H04L 9/00
(52) U.S. Cl. ............... 379/67.1; 379/93.03; 382/115; 713/186
(58) Field of Search .................. 379/67.1, 88.07, 379/88.19, 88.22, 88.23, 88.25, 88.27, 88.28, 93.01, 93.02, 93.03, 10.01; 713/182, 184, 186; 382/100, 115; 340/5.1, 5.2, 5.51, 5.52, 5.53; 902/3

(56) References Cited

U.S. PATENT DOCUMENTS

| | | | | |
|---|---|---|---|---|
| 4,429,413 A | * | 1/1984 | Edwards | .................. 324/71.1 |
| 5,247,497 A | * | 9/1993 | Cohn | .................. 369/26.01 |
| 5,684,862 A | * | 11/1997 | Finnigan | .................. 379/207.03 |
| 5,872,834 A | * | 2/1999 | Teitelbaum | .................. 379/110.01 |
| 5,912,951 A | * | 6/1999 | Checchio et al. | .................. 379/67.1 |
| 6,104,922 A | * | 8/2000 | Baumann | .................. 455/410 |
| 6,259,805 B1 | * | 7/2001 | Freedman et al. | .................. 382/115 |

\* cited by examiner

*Primary Examiner*—Fan Tsang
*Assistant Examiner*—Roland G. Foster

(57) ABSTRACT

A telephone answering device uses capacitive fingerprint minutia analysis to provide individualized user access to messages stored by the device. The capacitive sensor provides inputs to an fingerprint identification module which compares identifying patterns in the ridges of a finger touching the telephone answering device's playback key to patterns registered for access to one or more categories of messages stored by the telephone answering device. If the identifying patterns match those of a registered user of the device, the categories of messages for which the user is registered are played back. A different category of messages is played back when the same user touches the playback key repeatedly, until all categories of messages for which the user is registered have been played back. The playback key includes a capacitive or push button switch for activating the fingerprint identification module.

19 Claims, 2 Drawing Sheets

FINGERPRINT-ID-ACTIVATED MESSAGE PLAYBACK APPARATUS AND METHOD

BACKGROUND OF THE INVENTION

The present invention pertains to a method and apparatus for retrieving stored messages. More particularly, the present invention is directed to providing individualized access to stored messages.

Some telephone message recording systems provide password-protected access to recorded telephone messages. Other telephone message recording equipment provides multiple, caller-selectable mail boxes where messages stored for respective addressees can be selectively played back by anyone. Both types of services are provided by many conventional stand-alone telephone answering devices (TADs) or integrated into telephones.

In either instance, the person playing back the stored messages must "program" the answering device or system; that is, this person must either select the mailbox number for the desired messages, or some other registered user ID, to hear the recorded messages. This requires the person to select and remember a user ID or password. Such passwords or IDs are frequently forgotten and in any event provide additional burdens in an environment of ever-increasing numbers of access codes which need to be remembered. Preferably such individualized playback would have convenient, one-button access, instead, like general-access TADs that play messages back for anyone, anytime the "playback" key is pressed.

There is thus a need for an improved TAD which provides secure but simple individualized access to messages.

SUMMARY OF THE INVENTION

The present invention provides individualized one-button access to recorded stored information by retrieving the information only in response to a playback key being touched by a person registered for access to one or more particular categories of stored messages. Providing individualized access to stored information is thus simplified by eliminating the separate step of receiving user inputs to identify the person requesting access.

In accordance with the present invention, a message recording system has a message storage medium on which multiple audio messages can be stored and a playback mechanism for providing an audible reproduction of a stored message has a playback switch that initiates an audible reproduction of a stored audio message, and a playback key that actuates the playback switch. The playback key includes a fingerprint sensor that provides a fingerprint identification signal to a fingerprint identification module. The playback key actuates the playback switch when a pattern indicated by the fingerprint identification signal is matched by the fingerprint identification module with a pattern registered for access to one or more categories of stored messages.

The message recording system has a registration mode which allows one or more users to register their fingerprints through the fingerprint sensor. The fingerprints are associated with user names or one or more mailbox identifications. The fingerprint identifications are then stored in a memory device in the recording system or located remotely from the system but accessible through a telecommunication link such as a network.

The playback key may also include a capacitive switch that activates the fingerprint identification module when the playback key is actuated, so that the fingerprint identification module attempts to match a pattern indicated by the fingerprint identification signal that was provided by the fingerprint sensor to the fingerprint identification module when the capacitive switch was touched with a pattern registered for access to one or more categories of stored messages when the playback key is actuated.

In another embodiment, the playback key includes a push button switch that activates the fingerprint identification module so that the fingerprint identification module attempts to match a pattern indicated by an information signal that was provided by the fingerprint sensor to the fingerprint identification module when the push button was actuated, with a pattern registered for access to one or more categories of stored messages when the playback key is actuated.

In particular embodiments, the message recording system includes a category or channel selector having multiple settings selecting respective predetermined categories of messages to be audibly reproduced by the playback mechanism. The playback key provides a channel-increment signal that sets the channel selector to a respective different setting each time the playback key is actuated, or if the playback key is actuated continuously for a set amount of time, so that a different predetermined category is selected until all the predetermined categories for the pattern matched by the fingerprint identification was registered have been selected. Categories may include types of messages, such as business or personal, or priorities of messages such as urgent or non-urgent.

To play back messages stored by the recording system in accordance with the present invention, the system responds to actuation of the playback key by sensing a pattern on a surface used to actuate the playback key, then matching the sensed pattern to a pattern registered for access to one or more categories of messages, and playing back messages in a category for which the matched pattern is registered. Messages of a different category are played back each time the playback key is actuated, when the playback key is actuated repeatedly by a surface having the same pattern, until messages in all categories for which that pattern is registered have been played back. In particular embodiments the fingerprint identification module is activated when the playback key is actuated.

BRIEF DESCRIPTION OF THE DRAWINGS

The features and advantages of the present invention will be better understood when the preferred embodiments described below are considered in conjunction with the figures provided, wherein.

In the figures, like items are assigned like reference numerals.

DETAILED DESCRIPTION OF THE PREFERRED EMBODIMENTS

Figure 1:
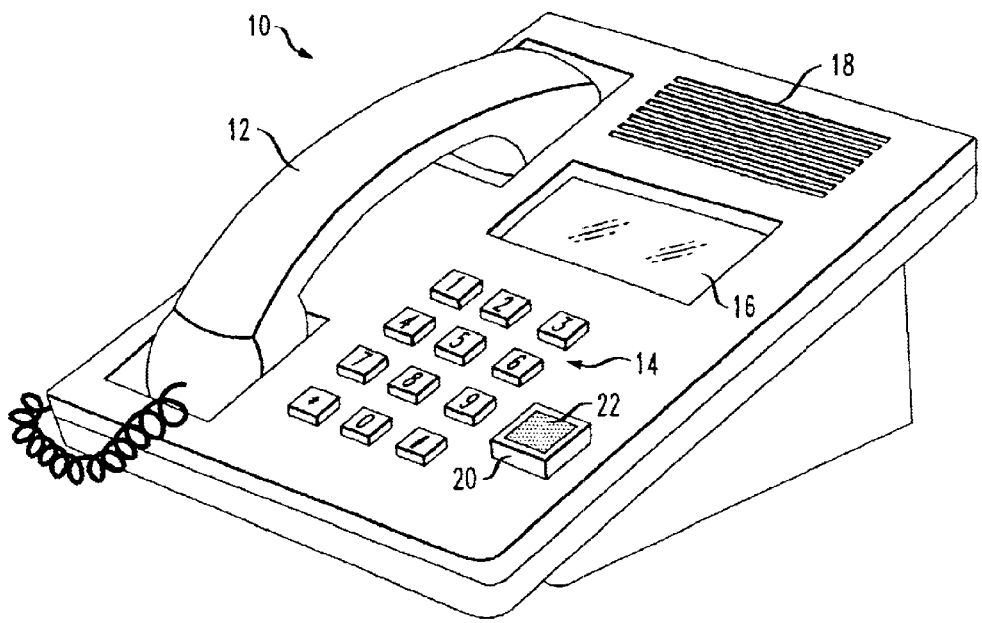
FIG. 1 is a plan view of a telephone answering device (TAD) in accordance with one embodiment of the present invention.

With reference to FIG. 1, a multiple-mailbox telephone answering device (TAD) 10 is shown, having a handset 12, a keypad 14, a display panel 16 that provides date, time, and caller ID information as well as displaying each number selected on the keypad, and a loudspeaker 18, as is well known in the art. The TAD 10 shown in FIG. 1 also has a playback key 20 having a capacitive fingerprint sensor 22 on its exposed upper surface, such as the one described in U.S. Pat. No. 4,429,413, which is hereby incorporated herein by reference. Other examples of fingerprint sensors which may be used include the "FPS100" fingerprint sensor and the "VFS I USB" fingerprint sensor module sold by "VERIDICOM, INC." of Santa Clara, Calif.

Figure 2:
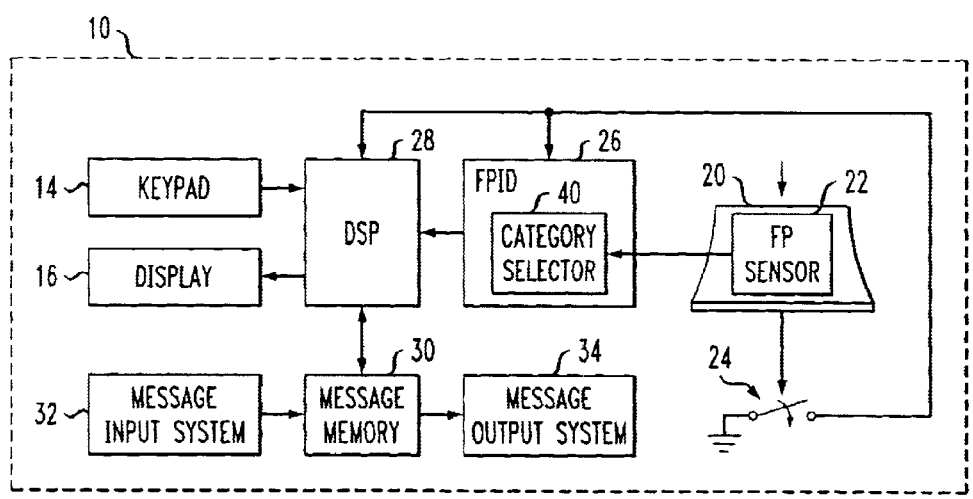
FIG. 2 is a block diagram of a TAD in accordance with one embodiment of the present invention.

The TAD 10 may be a stand-alone device or may be connected to a voice mail system in which messages and, in accordance with the invention, fingerprint identifications, are stored in a remotely located central server. An exemplary stand-alone TAD 10 is shown in FIG. 2. Referring to FIG. 2, the TAD 10 includes a push-button switch 24 coupled to the playback key 20 such that pressing the playback key 20 closes and actuates the push-button-switch 24. The push-button switch 24 provides a signal which activates a fingerprint identification module 26.

The capacitive fingerprint (FP) sensor 22 provides a signal indicating a pattern found by the sensor 22 on the surface of the playback key 20 to the fingerprint identification (FPID) module 26. The fingerprint identification module 26 uses the signal provided to it by the sensor 22 to determine whether a match exists between patterns registered with the fingerprint identification module 26 and the pattern represented by the signal provided by the fingerprint sensor 22. Suitable capacitive fingerprint sensors and fingerprint identification modules sold by "VERIDICOM, INC." of Santa Clara, Calif. are used. However, any suitable fingerprint identification module and sensor technology may be used.

The fingerprint identification module 26 provides a signal identifying the user, based upon the result of its comparison of the sensed pattern to the stored patterns, to a programmed digital signal processor (DSP) 28 when it is activated by the push-button switch 24. The DSP 28, which may alternatively be a conventional microcontroller or microprocessor, is coupled to a message memory 30 which stores messages for the users. The DSP 28 is also coupled to and provides messages to the display panel 16 which indicates the identity of and existence of messages for the registered user such as: "MESSAGES FOR [registered name]", "NO NEW MESSAGES FOR [registered name]", or simply "TRY AGAIN" if no match was found.

The DSP 28 is coupled to the keypad 14 to receive inputs from users. For example, keypad input may be used to place the DSP 28 in registration mode, in which users register their fingerprints in association with user IDs or mailbox numbers. Messages are received through a conventional message input system 32, which may include conventional hardware and software elements for capturing and storing voice messages from callers. Messages retrieved from the message memory 30 are output through a message output system 34, which includes conventional elements such as an output amplifier (not shown) and speaker 18.

Address information, enabling the message memory 30 to selectively retrieve messages for the particular identified registered user, is supplied to the memory 30 by the DSP 28. While the key 20 is pressed, the DSP 28 triggers the playback of those selected messages by the message output-system 34 when a match has been found, using any one of the suitable technologies well-known in the art. In the message output system 34, the audio signal constituting the message is received from the message memory 30 and transmitted for output through the speaker 18. As in conventional touch-tone telephones, the TAD 10 includes a dual-tone-multiple-frequency (DTMF) device which converts the signals from the keypad 14 to touch tone signals and a public switched telephone network (PSTN) signal input/output (I/O) interface which places the signals on the telephone network (both not shown).

In particular embodiments, the TAD 10 allows each registered user to store their messages in a number of different categories. Categories could include, for example, archived messages, urgent messages, personal messages, business messages, etc. In particular embodiments, the categories represent priorities of messages, such as urgent, important, low, etc., and callers and/or users assign the priority status to each message. The TAD 10 presents messages in priority sequence.

To facilitate the selection of categories, the fingerprint identification module 26 contains a category selector routine 40. The category selector routine 40 causes the fingerprint identification module 26 to store each fingerprint pattern in memory and compare it to the next received pattern. If the switch 24 is actuated repeatedly, or actuated continuously for predetermined time intervals, but the pattern indicated by the sensor is the same, the category selector routine 40 executing in the fingerprint identification module 26 selects another category registered for that pattern each time the key 20 is actuated, overriding any playing of other messages, if necessary, to immediately play messages for the next category registered for that pattern. This continues until all names registered for that pattern have been selected, whereupon the sequence of names is repeated until another pattern is indicated by the sensor 22 when the key 20 is actuated.

Figure 3:
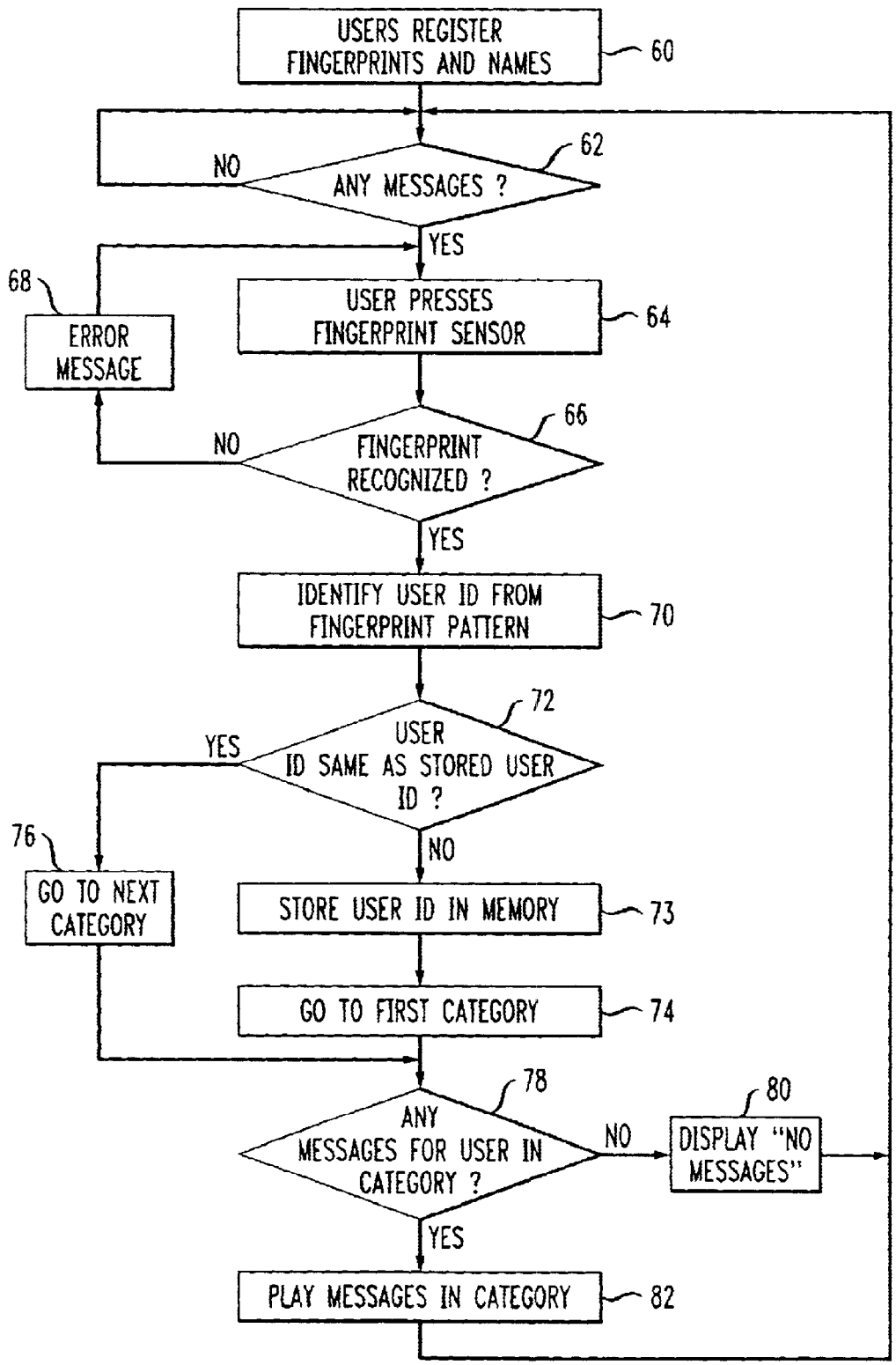
FIG. 3 is a flowchart showing a process for playing back messages in response to fingerprint activation in accordance with the present invention.

A method for playing back stored messages using fingerprint sensing technology is described with reference to the flow chart in FIG. 3. Users register their fingerprints and user names or IDs in step 60, which are stored together in a database file or table in the fingerprint identification module 26. In particular embodiments, registration is performed by each user touching the fingerprint sensor 22 and entering a user ID or mailbox number through the keypad 14. Certain users may have multiple mailboxes associated with their fingerprint, and certain mailboxes, such as a family of group mailboxes, may be registered to and associated with multiple users. In addition, other parameters or controls may be set and stored for particular users during registration or thereafter, such as parameters determining whether a given user has authority to access all categories of messages or to delete messages such as in a group or family mailbox. Alternatively, unprotected messages may be stored in a global mailbox.

The method then waits for messages by executing step 62 and looping back until a message is received in step 62. The user presses the fingerprint sensor 22 in step 64 to begin the message retrieval process. The user's fingerprint pattern is compared in step 66 with the registered patterns to determine if the fingerprint is recognized. If not recognized, an error message is displayed in step 68 and the current user; that is, the user who most recently pressed the fingerprint sensor 22, or alternatively another different user, can press the sensor 22. Alternatively, unrecognized users may have access to unprotected messages stored in a global mailbox, such as generic messages including general instructions for accessing and using the TAD 10.

If the fingerprint is recognized, the corresponding user ID is retrieved from the database file and stored in temporary memory in step 70 to be a retrieved ID. The retrieved user ID is compared in step 72 to the current stored user ID, if any, previously stored in the temporary memory by previous executions of steps 64–73. If the user ID differs from the current stored user ID in the temporary memory, this is an indication that a new user different from the last user is accessing messages. Accordingly, if step 72 determines a different current user, the current user ID is stored as the current stored user ID in the temporary memory in step 73 for comparison with the next user ID retrieved. The method then goes to the first category in a preset sequence of categories in step 74, and proceeds to step 78.

If the current user ID is identical to the stored user ID as determined in step 72, this is an indication that the same user is accessing messages, and a next category, if any, in the sequence is identified and accessed in step 76, and the method proceeds to step 78. The method thus tracks the current category for each user, such as by the use of a pointer or similar structure. Alternatively, a single person may be registered to multiple mailboxes in the TAD 10. The person presses the button 20 so that his or her fingerprints are identified in step 66, and then enters the mailbox number through the keypad 14.

Whatever the category, it is determined whether any messages are stored for that category in step 78. If no such messages exist, a "no messages" message is displayed in step 80, and the system awaits the next press of the fingerprint sensor 22 by looping back to step 64. If messages exist in storage for the category in step 78, the messages are played in step 82, and the method then loops back to step 64.

The messages may be played upon a single verification of the user to access the messages. Alternatively, the messages may be played only while the user holds down the button 20, and optionally the method may continually or periodically scan the held-down button 20 to verify the user while the messages playing. In additional embodiments, once the button 20 is pressed and the user is verified such that the messages are accessed, the messages are continued to be played until the button 20 is pressed by the user or by another to stop the playing of the messages. Alternatively, the messages may be continually played until the current user who accessed the messages presses the button 20 and after the fingerprint sensor 22 verifies the current user as the user who accessed the messages, as in step 72.

The present invention has been described with particular reference to presently preferred embodiments thereof. However, variations and modifications are possible within the spirit and scope of the invention. For example, the single unit TAD may be replaced by a networked voice mail system which includes a central server storing voice messages and individual telephone units containing fingerprint identification modules as described herein. Users would input fingerprint patterns rather than password or other identifications to access the voice messages stored under their names on the central server. The invention is defined by the claims appended below.

What is claimed is:

1. A message recording system having a message storage medium on which multiple messages can be stored and a playback mechanism for providing a reproduction of a stored message, the system comprising:
   a playback switch connected to the playback mechanism so that actuation of the playback switch initiates a reproduction of a stored message;
   a fingerprint identification module activated by a fingerprint identification signal and a switch; and
   a playback key, connected to actuate the playback switch and the switch, including a fingerprint sensor to provide the fingerprint identification signal to the fingerprint identification module when the playback key is actuated, the playback key actuating the playback switch when a first pattern, indicated by the fingerprint identification signal input to the fingerprint identification module, is matched by the fingerprint identification module with a second pattern registered for access to a category of stored messages.

2. The message recording device of claim 1, wherein the messages are audio messages; and
   wherein the playback mechanism, responsive to actuation of the playback switch, generates an audible reproduction of the stored audio message.

3. The message recording device of claim 1, wherein the fingerprint sensor is a capacitive fingerprint sensor.

4. The message recording device of claim 3, wherein the switch is a capacitive switch.

5. The message recording device of claim 1, wherein the switch is a push button switch.

6. A message recording system having a message storage medium on which multiple messages can be stored and a playback mechanism for providing a reproduction of a stored message, the system comprising:
   a category selector having multiple settings, each setting selecting a predetermined category of messages to be reproduced by the playback mechanism;
   a playback switch connected to the playback mechanism so that actuation of the playback switch initiates the reproduction of the stored message; and
   a playback key, connected to the playback switch and to the category selector, to set the category selector and to actuate the playback switch, the playback key including a fingerprint sensor to provide a fingerprint identification signal to the input of a fingerprint identification module when the playback key is actuated, the playback key actuating the playback switch when a first pattern indicated by the fingerprint identification signal input to the fingerprint identification module is matched by the fingerprint identification module with a second pattern registered for access to a category of stored messages, the playback key providing a setting signal for setting the category selector to a selected setting that selects a first predetermined category registered for the second pattern matched by the fingerprint identification signal.

7. The message recording system of claim 6, wherein the messages are audio messages; and
   wherein the playback mechanism, responsive to actuation of the playback switch, generates an audible reproduction of the stored audio message.

8. The message recording system of claim 6, wherein the playback key provides a category increment signal to the category selector for setting the category selector to a selected setting that selects a different predetermined category of messages each time the playback key is actuated, until all of the predetermined categories have been selected for which the pattern matched by the fingerprint identification was registered.

9. A method for playing back messages stored by a recording device having a message storage medium on which multiple messages can be stored and a playback mechanism for providing a reproduction of a stored message, the method comprising the steps of:
   responding to actuation of a playback key by sensing a first pattern on a first surface and a second pattern on a second surface wherein the first pattern and the second pattern are used to actuate the playback key;

matching the first sensed pattern to a first pattern registered for access to the messages associated with the first registered pattern;

playing back the associated messages for which the matched pattern is registered;

storing the first registered pattern in temporary memory as a current pattern;

matching the second sensed pattern with the current pattern; and maintaining the current pattern in memory responsive to a match of the current pattern with the second sensed pattern.

10. The method of claim 9, wherein the messages are audio messages; and wherein the step of playing back messages includes the step of generating an audible reproduction of the stored audio message.

11. The method of claim 9, wherein the matching provides access to a category of the messages;

wherein the playing back of the associated messages includes playing back associated messages in the accessed category.

12. The method of claim 9, further comprising the step of:

playing back messages of a different category each time the playback key is actuated.

13. The method of claim 12, wherein, when the playback key is actuated repeatedly by any surface having the same pattern as the first surface, the messages of the different category are played back until messages in all categories registered have been played back for which the matched pattern is registered.

14. The method of claim 9, further comprising the step of:

activating a fingerprint identification module.

15. The method of claim 9, further comprising the steps of:

matching the second sensed pattern to a second pattern registered for access to the messages associated with the second registered pattern;

updating the current pattern in memory to be the second sensed pattern responsive to the current pattern not matching with the second sensed pattern; and playing back the associated messages of the current pattern.

16. The method of claim 15, further comprising the step of:

responsive to no match of the current pattern with the second sensed pattern, accessing for play-back the associated messages of a first category corresponding to the second sensed pattern.

17. The method of claim 15, further comprising the steps of:

playing back the associated messages of a first category corresponding to the first sensed pattern; and responsive to the match of the current pattern with the second sensed pattern, accessing for play-back the associated messages of a successive category corresponding to the matched second sensed pattern.

18. The method of claim 9 wherein the first surface is the surface of a finger of a user, and the first pattern is a fingerprint of the respective finger.

19. The method of clam 18, wherein the step of matching the first sensed pattern to the first registered pattern includes the step of:

activating a fingerprint identification module to generate first fingerprint data from the surface of the finger, and to compare and match the first fingerprint data with stored fingerprint data corresponding to the first registered pattern.

* * * * *